US009413258B2

(12) United States Patent
Chau et al.

(10) Patent No.: US 9,413,258 B2
(45) Date of Patent: Aug. 9, 2016

(54) AC LOAD DETECTION AND CONTROL UNIT

(71) Applicant: QUALCOMM Incorporated, San Diego, CA (US)

(72) Inventors: Kiet Tuan Chau, San Diego, CA (US); Michael-David Nakayoshi Canoy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 14/248,524

(22) Filed: Apr. 9, 2014

(65) Prior Publication Data

US 2015/0295505 A1 Oct. 15, 2015

(51) Int. Cl.
*H01H 47/22* (2006.01)
*H02M 5/293* (2006.01)
*H02J 3/14* (2006.01)
*H02J 13/00* (2006.01)
*H05B 37/02* (2006.01)

(52) U.S. Cl.
CPC ................. *H02M 5/293* (2013.01); *H02J 3/14* (2013.01); *H02J 13/0075* (2013.01); *H05B 37/0263* (2013.01); *H02J 2003/143* (2013.01); *Y02B 70/3225* (2013.01); *Y02B 70/3283* (2013.01); *Y02B 90/2653* (2013.01); *Y04S 20/222* (2013.01); *Y04S 20/246* (2013.01); *Y04S 40/126* (2013.01)

(58) Field of Classification Search
CPC ......... H01H 47/02; H01H 47/22; H01H 3/22; H02M 1/083
USPC .............. 323/235, 318, 319; 307/98, 99, 125, 307/131, 132 E
See application file for complete search history.

(56) References Cited

U.S. PATENT DOCUMENTS

| 4,322,632 | A | 3/1982 | Hart et al. |
| 6,711,613 | B1 | 3/2004 | Ewing et al. |
| 6,870,463 | B2 | 3/2005 | Dresti et al. |
| 7,099,934 | B1 | 8/2006 | Ewing et al. |
| 7,327,275 | B2 * | 2/2008 | Brochu .............. G05B 23/0235 340/635 |
| 8,039,994 | B2 * | 10/2011 | Divan .................... H02H 9/001 307/103 |

(Continued)

FOREIGN PATENT DOCUMENTS

GB 2490736 A 11/2012

OTHER PUBLICATIONS

International Search Report and Written Opinion—PCT/US2015/024237—ISA/EPO—Jul. 9, 2015.

*Primary Examiner* — Gary L Laxton
(74) *Attorney, Agent, or Firm* — The Marbury Law Group, PLLC

(57) ABSTRACT

Devices and methods for controlling a state of a load powered by an AC power source include a control unit having a memory, a processor coupled to the memory, a current sensor, a relay and a phase detector. The current sensor detects whether current is drawn by the load. The processor is configured to receive from the current sensor a state indication including whether current is drawn by the load. The processor may store the received state indication in the memory. The phase detector detects a zero-crossing point of the AC power source and provides that indication to the processor. In response to receiving the state indication, the processor is configured to activate the relay to change a phase of current to the load using the zero-crossing point detected by the phase detector in order to limit current flowing to the load in order to remotely turn off the load.

30 Claims, 6 Drawing Sheets

(56) References Cited

U.S. PATENT DOCUMENTS

| | | | |
|---|---|---|---|
| 8,164,740 B2* | 4/2012 | Visser | G02B 27/0905 355/71 |
| 2003/0020417 A1 | 1/2003 | Williams et al. | |
| 2009/0167494 A1 | 7/2009 | Martins | |
| 2011/0032070 A1 | 2/2011 | Bleile | |
| 2011/0043034 A1 | 2/2011 | Pien | |
| 2011/0197080 A1 | 8/2011 | Ewing et al. | |
| 2013/0057247 A1 | 3/2013 | Russell et al. | |
| 2013/0131883 A1 | 5/2013 | Yamada | |
| 2014/0002093 A1* | 1/2014 | Elliott | G01R 31/3278 324/423 |

* cited by examiner

AC LOAD DETECTION AND CONTROL UNIT

BACKGROUND

Devices and systems that enable remote actuation of electrical devices, particularly alternating current (AC) appliances, are becoming popular to assist people with disabilities and to enable home automation. Currently, home automation appliances require the user to leave their AC load/appliance on in order to provide remote on/off functionality. However, home automation and similar systems are unable to detect and/or react to a manual power-off or loss of power at the load/appliance.

SUMMARY

The various embodiments include devices and circuits (referred to as a control unit), as well as methods implemented in such devices and circuits, for controlling a state of a load powered by an AC power source. In particular, the various embodiments enable monitoring and/or reporting of the on/off state of an AC load device, such as a lamp, appliance or other electronic device, while maintaining the ability to remotely turn the AC load device on or off. In an embodiment, a control unit may include a memory, a processor coupled to the memory, a current sensor, a relay and a phase detector. The current sensor may detect whether current is drawn by the load from the AC power source. The processor may be configured to receive from the current sensor a state indication including whether current is being drawn by the load. The processor may store the received state indication in the memory. The relay, which may be a solid-state relay or a triac, may be coupled to the processor and the current sensor. The phase detector may detect a zero-crossing point of the AC power source. The processor may be configured with processor-executable instructions to activate the relay in response to receiving the state indication and the phase detector detecting a zero-crossing point of the AC power to change a phase of current to the load. The processor may be configured with processor-executable instructions to receive from the phase detector a trigger signal, wherein the relay is activated to change the phase of current flowing to the load in response to receiving the trigger signal. In particular, the processor may activate the relay to change the phase of current to the load to allow full power to the load from the AC power supply when the state indication reflecting current is actively drawn by the load. Also, the processor may activate the relay to change the phase of current to the load to a small amount in response to the state indication reflecting current is not drawn by the load. In the various embodiments, the received state indication may reflect a "user-on" state in response to the current sensor detecting current actively drawn by the load, and reflect a "user-off" state in response to the current sensor not detecting current drawn by the load.

In an embodiment, the control unit may further include a transceiver coupled to the processor for communicating with a remote computing device and/or other control units with similar compliments. The processor may transmit the received state indication or receive one or more switch indications from the remote computing device. In response to the transceiver receiving a switch indication from the remote computing device, the processor may activate the relay to change a phase of current to the load.

Further embodiments include a method of performing the various operations performed by the control unit discussed above.

Further embodiments include a computing device having means for performing functions corresponding to the method operations discussed above.

Further embodiments include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
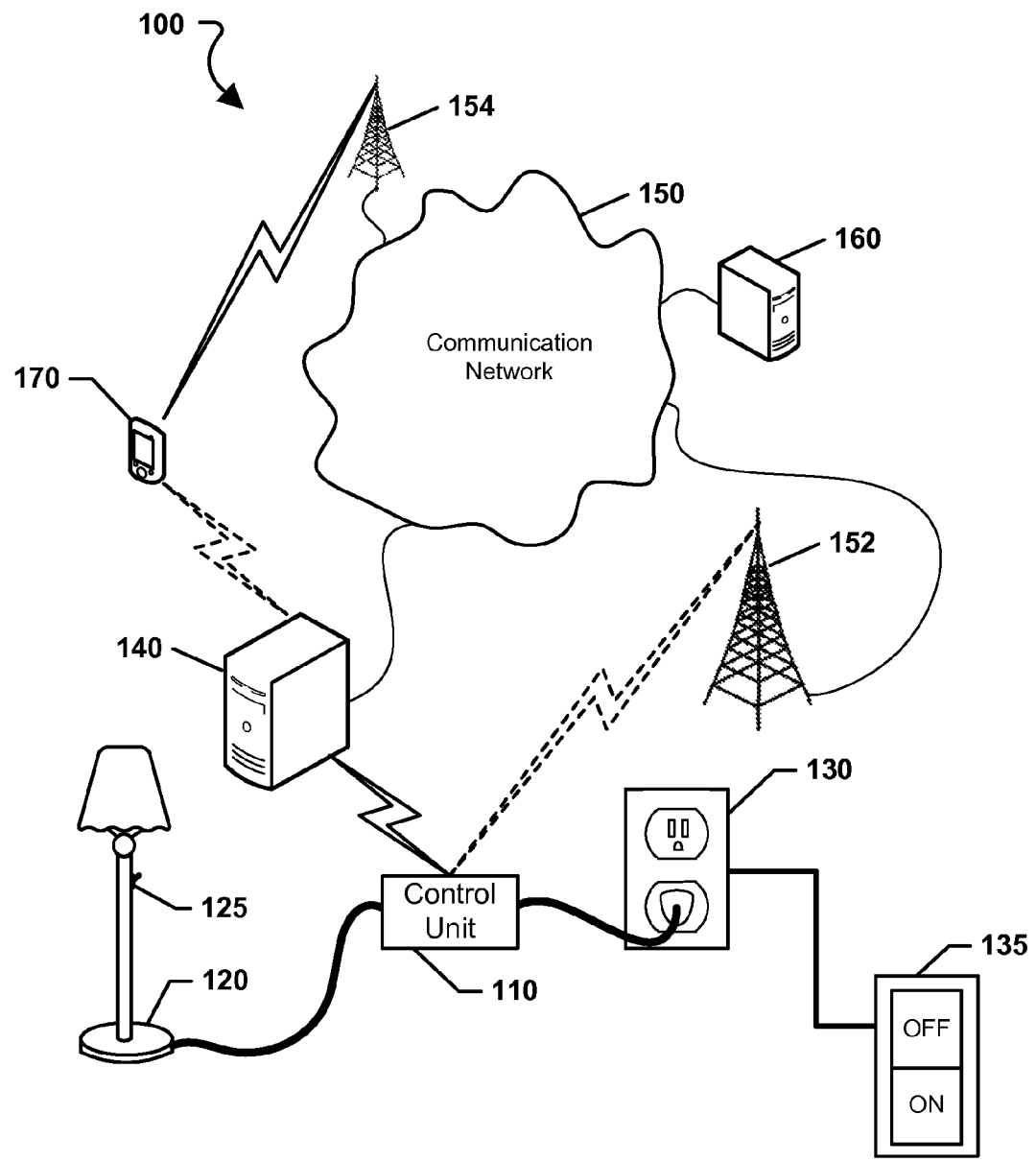
FIG. 1 is a schematic diagram of a communication system suitable for use with the various embodiments.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "AC load device," "AC load" and "load" are used interchangeably herein to refer to any electrical appliance that uses and draws current from a local alternating current (AC) power source. The AC load device may be any electrical device from a small consumer electronic device to a large-scale commercial appliance.

The term "AC power source" as used herein refers to a source or supply of alternating current for delivery of electrical energy to an AC load device. AC load devices may be connected to an AC power source through a plug, socket, receptacle or other connection for normal operation.

The term "computing device" is used herein to refer to any one or all of laptop computers, desktop computers, servers, tablet computers, smart books, palm-top computers, cellular telephones, smart phones, personal or mobile multi-media players, personal data assistants (PDA's), wireless electronic mail receivers, multimedia Internet enabled cellular telephones, televisions, smart TVs, smart TV set-top buddy boxes, integrated smart TVs, streaming media players, smart cable boxes, set-top boxes, digital video recorders (DVR), digital media players, and similar electronic devices that include a programmable processor.

The various embodiments enable the monitoring and/or reporting of the on/off state of an AC load device, such as a lamp, appliance or other electronic device, while maintaining the ability to remotely turn the AC load device on or off. The various embodiments include a control unit interposed between the AC load device and a source of AC current. The control unit may include a processor, a current sensor, a phase detector and a relay, such as a solid state relay or Triac. The current sensor may be configured to determine whether AC current is being drawn by the AC load device and provides that determination to the processor. Using the current sensor determination, the processor may drive the relay to change the phase of the AC current that reaches the load. The phase detector, such as a bridge rectifier, may detect a zero crossing point of an AC power source, which the processor may used to control the circuit to appropriately change the phase of the AC load.

In the various embodiments, as a default when the circuit powers-on, an initial AC phase configuration may be implemented that allows only a small amount of current through the circuit to the AC load. Allowing a small amount of current may enable the current sensor to detect whether a load connected to the circuit is configured to draw power (i.e., is in a manual "on" state), which is referred to as a "user-on" state, or not (i.e., is in a manual "off" state), which is referred to as a "user-off" state. Such a small amount of current, which is referred to herein as a "trickle charge," may be enough current to be detectable by the current sensor when the load is "on" but not enough current to actually power the load.

The processor may be configured to recognize detection by the current sensor of the trickle charge being drawn by the load as indicating that the load is in the "user-on" state. Within a fraction of a second the current sensor may detect the trickle charge being drawn by the load, and thus the processor can determine that the AC load is in a "user-on" state, in which case the processor may control the relay to adjust the AC output phase to apply full power to the load. A "user-on" state indication may be stored in a memory of the control unit and/or reported to a remote computing device.

If the current sensor does not detect any (or significant) current being drawn by the load when the trickle charge is applied, the processor may determine that the load is in a "user-off" state. The "user-off" state indicates that the load would not draw any AC power if it were connected to the AC power source, such as when a user manually switches an appliance off. A "user-off" state may also occur when a user turns off power to an outlet connected to the control unit and the load. When the "user-off" state is detected, the processor will activate the relay using the phase detector to reset the phase of the AC current to once again allow only the default trickle charge to pass through the circuit. A "user-off" state indication may be stored in a memory of the control unit and/or reported to a remote computing device. In this way, if/when the user turns the AC load back on, the control unit may once again detect the trickle charge that resumes being drawn by the AC load. Also, control unit will then allow full power to be drawn by the load, which will turn the load on. Thus, without input from anything other than the AC load itself, the control unit may detect and respond to whether or not a load is active.

Additionally, the control unit may be used to remotely control the on/off state of the load when it is left in the "user-on" state. In order to remotely turn on a load that is in a "user-on" state, the processor may control the relay to permit power to flow to the load by leaving the relay in one state. In order to remotely turn off a load that is in a "user-on" state, the processor may selectively activate the relay using the phase detector to reset the phase of the AC current to once again allow only the default trickle charge, thereby placing the load in a "soft-off" state. The "soft-off" state may be initiated by the processor, such as in response to receiving a command from the remote computing device or as a learned response to observed events. In the "soft-off" state, the current sensor may detect that current drawn by the load, but the load does not appear on to an observer. In the "soft-off" state, the processor is able to selectively turn the load back on by deactivating the relay, thereby allowing AC current to flow to the load. The "soft-off" state indication may be stored in a memory of the control unit and/or reported to the remote computing device.

FIG. 1 illustrates a control unit 110 used in conjunction with an AC load device 120, a source of AC current and a computing device 140. The control unit 110 may be interposed between the AC load device 120 and an AC power source 130. An AC power receptacle is shown as an exemplary AC power source 130. As discussed above, the control unit 110 may detect the state of the AC load device and control AC current flowing to the load when the AC load is in the "user-on" state. Also, the control unit 110 may report the state of the AC load device to one or more remote computing devices 140, 160, 170.

The control unit 110 may be implemented in a variety of forms, such as a standalone unit, integrated as a permanent component of the AC load device 120, or integrated with the AC power receptacle. For example, the control unit 110 may be a removable appliance designed with at least one electrical socket to receive a conventional power plug from the AC load device 120. A removable appliance embodiment of the control unit 110 may include its own power plug for insertion into an AC power receptacle. The control unit power plug may plug directly into the AC power receptacle or include an extension cable.

The AC load device 120 may be any electrical appliance that uses and draws current from a local power source. The exemplary AC load device shown in FIG. 1 is a lamp 120, but virtually any electrical device may be connected to the control unit 110. Thus, the AC load device may be anything from a small consumer electronic device to a large-scale commercial appliance.

The AC power source 130 may be a conventional power receptacle suitable to power the desired AC load device 120. The exemplary AC load device 120 includes a local on/off switch 125, as is common with many appliances, but an AC load device in accordance with the various embodiments need not have its own on-off switch. Similarly, the exemplary AC power source 130 includes its own on/off switch 135 in order to further explain optional ways in which power to the AC load device may be interrupted and/or limited but still detected by the control unit 110.

In order to report the state of the AC load device, the control unit 110 may include a transceiver for communicating with the nearby computing device 140. The control unit may also communicate with a far away computing device 160 or a mobile computing device 170 via the local computing device 140. Alternatively, the control unit 110 may communicate with the far away computing device 160 using a wireless connection by way of a local communication terminal 152 connected to the communication network 150. Similarly, the control unit 110 may communicate with the mobile computing device 170 directly using short-range wireless communications, such as WiFi or Bluetooth®, or by way of the communication network 150 and one or more additional remote communication terminals 154. As a further alternative, the control unit 110 may include a wired connection to the computing device 140 or the communication network 150. The wireless or wired connection allows the control unit 110 to receive and/or transmit information. In this way, the control unit 110 may report state information and receive commands to alter the on/off state of the AC load device 120.

Figure 2A:
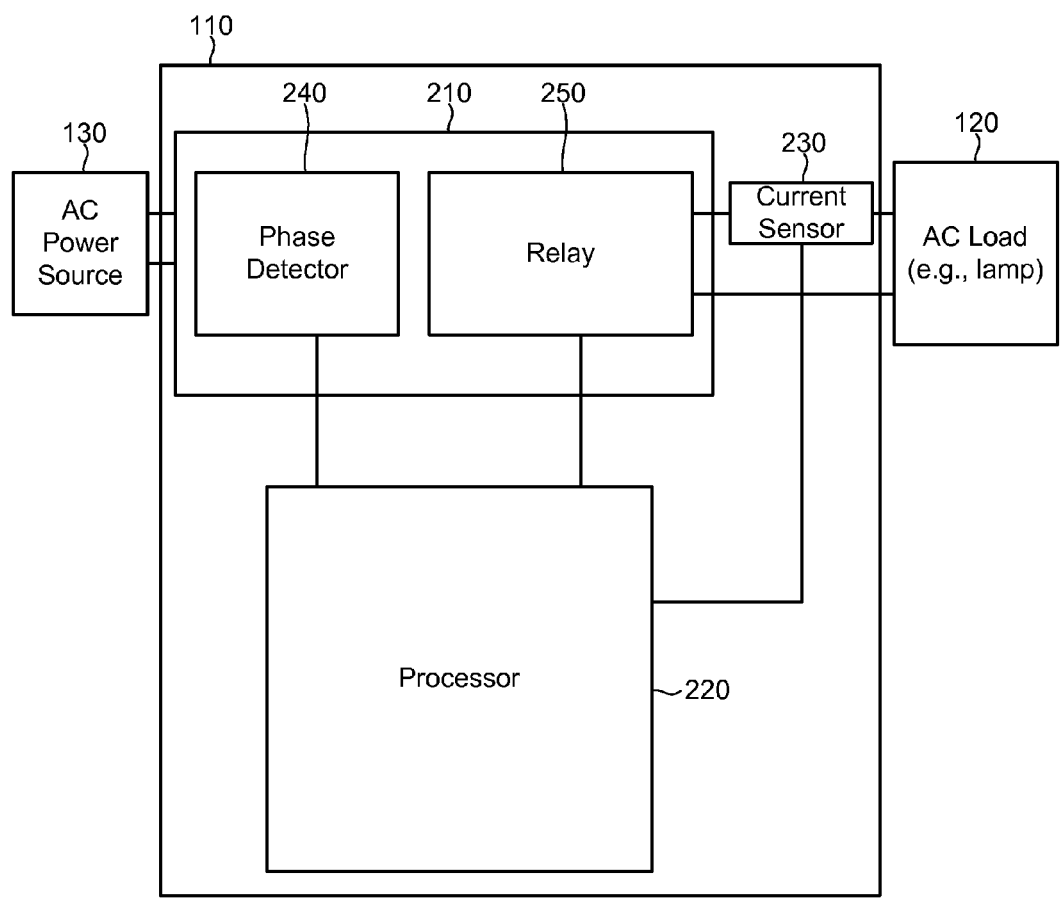
FIGS. 2A-2B are circuit block diagrams illustrating exemplary portions of a control unit according to various embodiments.
Figure 2B:
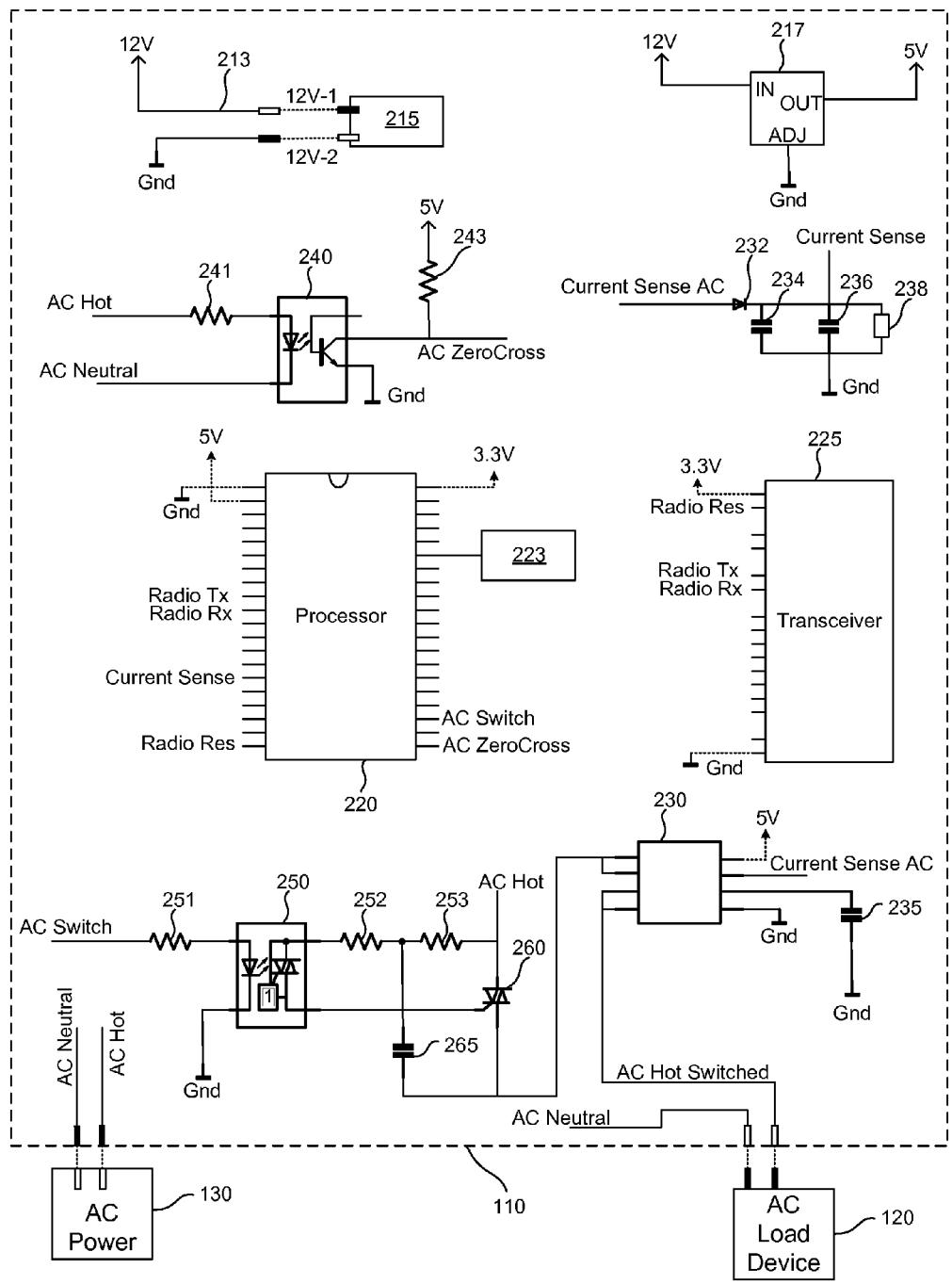

FIGS. 2A and 2B illustrate two embodiments of a control unit 110 coupled to an AC load device 120 and an AC power source 130. FIG. 2A is a high level complement diagram illustrating the main complements in one embodiment control unit 110, while FIG. 2B illustrates the main complements in further detail including major subcomponents of a particular embodiment. For illustrative purposes, the circuit block diagram in FIG. 2B shows the various components separated from one another, with the connection between each of the various circuit components denoted by matching labels.

Referring to FIG. 2A, the control unit 110 may include a processor 220 coupled to a current controller 210, and a current sensor 230. The current controller 210 may include a phase detector 240 and a relay 250. The control unit 110 may also include additional elements such as an internal power source 215, a volt converter 217, and a transceiver 225. As mentioned above, the control unit 110 may be electrically coupled between the AC power source 130 and the AC load 120. The phase detector 240 may be configured to detect the phases of AC power from the AC power source 130 and signal the phase to the processor 220. As described in more detail below, the processor may be configured with processor-executable instructions to perform operations including receiving the phase indication from the phase detector 240 and controlling the relay 250 based on the received phase indication and a desired operating state of the AC load 120. Also as described above, the current sensor 230 may be configured to signal to the processor 220 whether current is passing to the AC load 120. Additional components of an embodiment control unit 110 are described below with reference to FIG. 2B.

Referring to FIG. 2B, the processor 220 may be coupled to the current sensor 230 at the connection labeled "Current Sense." Also, the processor 220 may be coupled to the phase detector 240 at the connection labeled "AC ZeroCross." Additionally, the processor 220 may be coupled to the relay 250 at the connection labeled "AC switch." The processor 220 transmits and receives information and/or commands regarding a state of the AC load device 120. In this embodiment, transceiver 225 may be included for this purpose, which may be a Wi-Fi transceiver. Thus, the processor 220 may include an output transmitter connection labeled "Radio Tx," an input receiver connection labeled "Radio Rx," and the reset connection labeled "Radio Res." Alternatively, the control unit 110 may include a different type of wireless transceiver, such as a transceiver configured for short range or long-range communications, or a wired connection to a modem or other communication device. The processor 220 may be powered by an internal power source such as an onboard battery 215 so that it does not rely on the AC power source 130 it is monitoring. For example, a 12 volt battery may be included which may be coupled to ground and a battery connector 213. The volt converter 217 may be included to adjust the voltage output by the battery 215 to a voltage usable by the processor such as 5V. The converted voltage 5V may then be directly coupled to the processor 220. The processor 220 may itself output power to the transceiver 225, as indicated by the connection labeled 3.3V.

The processor 220 may be any programmable microprocessor, microcomputer or multiple processor chip or chips that may be configured by software instructions (applications) to perform a variety of functions, including the functions of the various aspects described herein. The control unit 110 may include multiple processors, such as one processor dedicated to wireless communication functions and one processor dedicated to controlling the circuit or running other applications. Typically, software applications may be stored in an internal memory 223 before they are accessed and loaded into the processor 220. The internal memory 223 may be sufficient to store the application software instructions. In many devices the internal memory may be a volatile or non-volatile memory, such as flash memory, or a mixture of both. For the purposes of this description, a general reference to memory refers to memory accessible by the processor 220 including internal memory 223 or removable memory plugged into the control unit 110 and memory within the processor 220.

The current sensor 230 may be used to detect whether the AC load device 120 is intended to be powered on or off by a user. The current sensor 230 may be either conductive or non-conductive. The current sensor 230 detects electrical current, such as AC current drawn by the AC load device 120. In the illustrated embodiment, the current sensor 230 may be coupled to the processor 220 at the connection labeled "Current Sense AC." The Current Sense AC connection may be directly coupled to internal circuit elements, such as a diode 232, capacitors 234, 235 and other elements 238, which in-turn direct couple the Current Sense connection to the processor 220. The current sensor 230 may be powered by the onboard converted voltage 5V. Also, the current sensor 230 may be coupled to the AC load device 120 through the connection labeled "AC Hot Switched." Together with an "AC Neutral" connection and the AC Hot Switched connection, the control unit 110 connects to the AC load device 120.

The phase detector 240 may be a bridge rectifier used to detect the zero crossing point of the AC power source 130. This will allow the circuit to appropriately change the phase of the AC load in order to control an observable on/off state of the AC load device 120. The illustrated phase detector 240 is a bridge rectifier, which uses a diode bridge to convert an AC current input into a DC output, but other forms of phase detection circuits may be used. The bridge rectifier illustrated in FIG. 2B is configured to ensure that its output is the same regardless of the polarity of the input. The phase detector 240 may be coupled to the AC Hot and the AC Neutral connections leading to the AC power source 130, as well as the onboard converted voltage 5V, using intermediate resisters 241, 243. Also the phase detector 240 may be coupled to the processor 220 at the connection labeled "AC ZeroCross." The phase detector 240 may be an electrical circuit that starts operation with the AC load voltage at close to zero-phase, compared to relays, such as triacs and silicon controlled rectifiers. The phase detector 240 may signal an interrupt to the processor, which the processor may use to signal the relay, such as a triac, to start conducting current as soon as possible so that the input and output voltages and waveforms are as close as possible. The point where the line voltage is zero volts is referred to herein as the zero cross point. By receiving a trigger as to when the zero cross point occurs the processor may trigger a triac to clip the beginning and end of the voltage curve to change the phase of the current, thus restricting or unrestricting the AC waveform.

The relay 250 may be a current controlling device that may be used to change the amount of current passing through a circuit. In a default "trickle charge" state, the solid-state relay 250 restricts current passing through the circuit to a trickle charge. When a gate-to-cathode voltage within the solid-state relay 250 exceeds a certain threshold, it switches modes to a "full power" state to allow the full current to be conducted through the circuit. The solid-state relay 250 will remain in an "full power" state even after gate current is removed as long as current through the device remains above a holding current.

Once current falls below the holding current for an appropriate period of time, the device may switch back to the default trickle charge state. If the gate is pulsed and the current through the device is below a latching current, the device will remain in the trickle charge state. If the applied voltage increases rapidly enough, capacitive coupling may induce enough charge into the gate to trigger the device into the full power state. Some solid-state relays, such as silicon-controlled rectifiers, are unidirectional devices that may only conduct current in one direction. The relay 250 illustrated in FIG. 2B is a triac, but may alternatively be any form of relay, particularly a solid-state relay. A triac is a bidirectional relay that may conduct current in either direction. In addition, a triac may control the percentage of a current allowed to flow through it, by applying a trigger pulse at a controlled phase angle (phase control). Such phase control may be used to reduce the power to the AC load device 120, rather than turning it off entirely. For example, installations in which the AC load device 120 is a lamp, the light may be dimmed by controlling the relay 250 reduce the net current flowing to the lamp, or the current to the lamp may be reduced to a trickle charge so that the lamp appears off to an observer. The triac may be turned on only during the time window allowed by the processor, in order to limit the amount of current. Solid-state relays may be turned "On" in the same manner as a pulsed triac.

Figure 3:
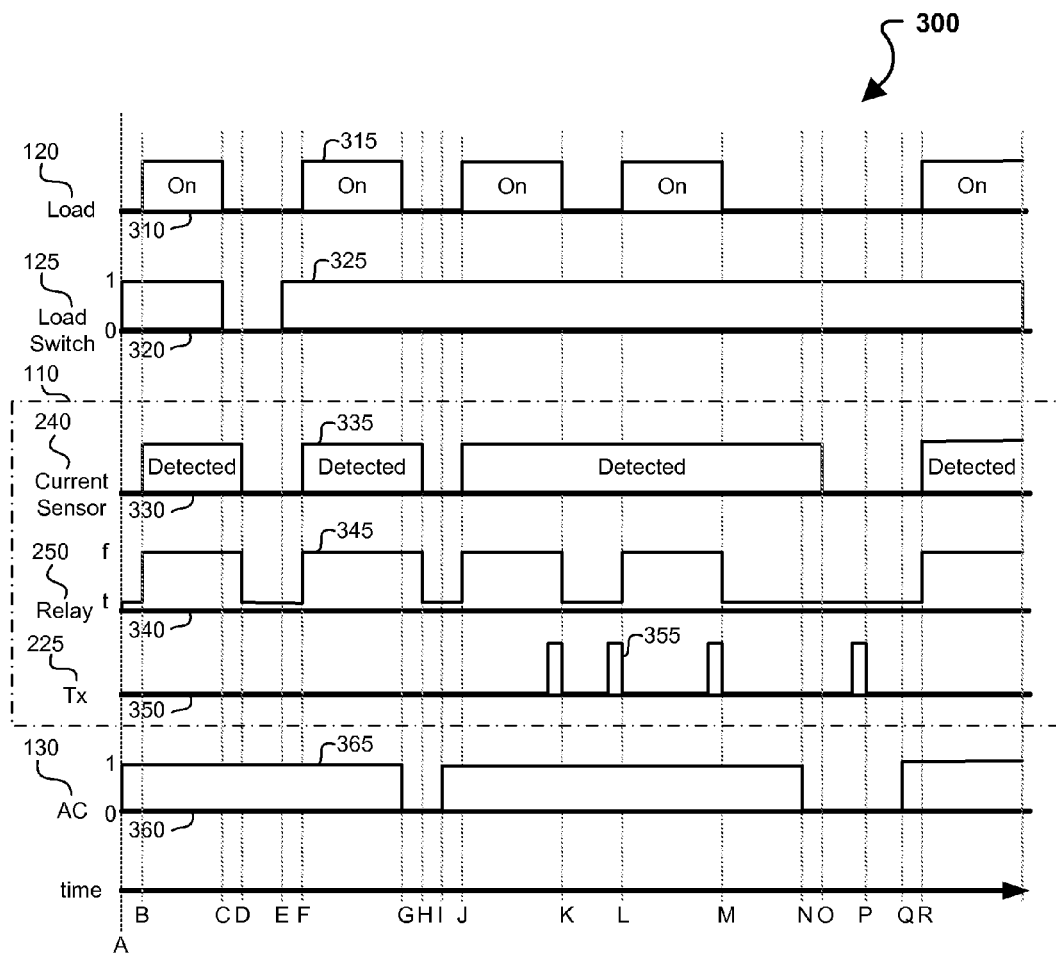
FIG. 3 is a time-line diagram of activity of an AC source, load and control unit components according to various embodiments.

FIG. 3 illustrates example operations of the control unit 110 in the form of a timeline diagram 300 of parallel activity of system elements including the AC load device 120, the transceiver 225, the current sensor 240, the relay 250, the load switch 125, and the AC power source 130 over time. Various illustrative points along the timeline, denoted by the letters A-Q, represent points in time when a change occurs in one or more of those system elements, as described further below. The load base line 310 represents an off state of the AC load device 120, while the load line 315 represents an on state of the AC load device 120 where it rises above the load base line 310 (labeled "On"). The switch baseline 320 represents an open position ("0") for the load switch 125 (generally associated with the "off" position for a switch), whereas switch line 325 represents a closed position ("1") for the load switch (generally associated with the "on" position for a switch) where it rises above the switch base line 320. The load switch 125 being in the open position reflects that a user has manually turned off the AC load device 120. The load switch 125 in the open position results in a "user-off" state. When the load switch 125 is in the closed position the load turns on when a full level of current flows to the AC load device 120. The load switch 125 in the closed position may result in a "user-on" state.

The current sensor baseline 330 represents a condition in which no current is detected by the current sensor 240 as flowing to the AC load device 120. When the current sensor 240 detects current flowing to the AC load device 120 the detection line 335 rises above the current sensor baseline 330. The relay baseline 340 represents a reference zero level of current allowed to flow through the solid-state relay 250. However, as described above the solid-state relay toggles between allowing a trickle charge (represented as "t") and full power (represented as "f"). Thus, the relay state line 345 represents a level of current allowed to flow through the solid-state relay 250 to the AC load device 120, which is either at the trickle charge or full current level.

The transceiver base line 350 represents a condition in which no command signal is received by the transceiver 225 of the control unit 110. In contrast, the command line 355, where it rises above the transceiver baseline and falls again, represents receipt by the transceiver of a switch indication from a remote source. The AC baseline 360 represents a powered off position ("0") for the AC power source, whereas the AC baseline 365 represents a powered on position ("1") for the AC power source where it rises above the AC baseline 365. The off position for AC power source may occur for example when power is lost or when a receptacle switch 135 is turned to an off position.

The timeline diagram 300 starts at time "A," which corresponds to a point in time when the AC power source 130 is turned on, the load switch 125 is in a closed position and the control unit 110 is in a default mode. In the default mode the relay 250 is set to allow only a trickle charge to pass to the AC load device 120. At time A, although the AC power source 130 is on and the load switch 125 is closed, the AC load device 120 is off because only a trickle charge of current is allowed to pass to the AC load device 120 by the relay 250. After a brief delay, at time "B" the current sensor 240 will detect the trickle charge flowing to the AC load device 120 and the relay 250 will immediately switch to allow a full current charge to the AC load device 120. Now with the AC power source 130 on, the load switch 125 closed and the relay 250 passing a full level of current, the AC load device 120 will come on at time B and be considered to be in an on state. The AC load device 120 will remain in the on state indefinitely until conditions change.

Time "C" represents a point in time when one type of condition change occurs by a user manually turning the load switch 125 off (i.e., to an open position ("0")), presumably to turn off the AC load device 120. This condition may be referred to as a "user-off" state. Since the load switch 125 directly controls the AC load device 120, the AC load device 120 will immediately turn off at time C. In the "user-off" state, the control unit 110 may not turn the AC load device 120 back on since power has been manually cut off to the load. In this situation, the power must be manually restored for the load state to change. As a result of the power being cut-off to the load, after a brief delay, at time D, the current sensor 240 will detect no current flowing to the AC load device 120, and the relay 250 will quickly revert to its default state allowing only a trickle charge of current to pass to the AC load device 120. Note that although at time D the relay 250 is allowing a trickle charge to pass to the AC load device 120, no such charge is actually passing because the load switch 125 is open, which is why the AC load device 120 remains off.

Time "E" represents a point in time when another condition change occurs, namely the load switch 125 is turned back on to the closed position ("1"). At time E although the AC power source is powered on, the relay 250 is still set to only allow a trickle charge and thus the AC load device 120 remains off. Moments later at time "F" the current sensor 240 will detect the trickle charge drawn by the AC load device 120 and the relay 250 will immediately switch to allow a full current charge to the AC load device 120 turning the AC load device 120 on. Time F is similar to time B in that the AC power source 130 is on, the load switch 125 is closed and the relay 250 is passing a full level of current.

Time "G" represents a point in time when the AC power source 130 has been turned off ("0"). This condition may be caused by a local power outage or power at the connected AC power receptacle being turned off. This condition is similar to a condition in which the user manually turns the load off at time C, described above, and may also be considered a "user-off" state, which immediately turns the AC load device 120 off. With the AC power source 130 off, the control unit 110 may not turn the AC load device 120 back on. Also, after a brief delay at time "H" the current sensor 240 will detect no current flowing to the AC load device 120 (because the AC power source is off) and the relay 250 will immediately revert to its default state allowing only a trickle charge of current to pass to the AC load device 120. Similar to time D, although the relay 250 is allowing a trickle charge to pass to the AC load device 120, no such charge actually passes because the AC power source is off, which is why the AC load device 120 remains off at time H.

Time "I" represents a point in time when another condition change occurs, namely the AC power source 130 is turned back on ("1"). At time I although the AC power source is powered on, the relay 250 is still set to only allow a trickle charge and thus the AC load device 120 remains off. Moments later at time "J" the current sensor 240 will detect the trickle charge flowing to the AC load device 120 and the relay 250 will immediately switch to allow a full current charge to the AC load device 120, turning the AC load device 120 on. Time J is similar to times B and F in that the AC power source 130 is on, the load switch 125 is closed and the relay 250 is passing a full level of current.

Time "K" represents a point in time when the transceiver 225 (Tx) has received a switch indication from a remote source. The switch indication is a command to change the current operating state of the AC load device 120. Such a command may be transmitted to the control unit 110 in order to remotely turn the load off or back on. The switch indication may the same command for turning the AC load device 120 on or off, or there may be different commands for turning the AC load device 120 on or off. The processor of the control unit 110 may store the switch indication in a memory. Also, the processor upon receiving a switch indication may cause the relay 250 to allow only a trickle charge of current to pass to the AC load device 120. With only a trickle charge passing to the AC load device 120, the load will be turned off at time K. The condition at time K is considered a "soft-off" state, since the AC power source 130 is on, the load switch is closed and a charge continues to be drawn by the AC load device 120, but the processor overrides the current sensor 240 to make the AC load device 120 to appear to be off. Thus, even after a brief delay from time K the AC load device 120 will not turn back on until conditions change.

Time L represents a point in time following time K at which the transceiver 225 receives another switch indication. Such a command may be transmitted to the control unit 110 in order to remotely turn the load back on. The processor of the control unit 110, upon receiving a second switch indication may immediately cause the relay 250 to allow a full current charge to pass to the AC load device 120. Without delay from time L the AC load device 120 will turn on.

Time "M" is similar to time K in that the transceiver 225 receives a switch indication which causes the processor to place the relay 250 in default mode allowing only a trickle charge, which immediately turns off the AC load device 120. However, before receiving another switch indication at time "P", the AC power source 130 is turned off ("O") at time "N" due to a power outage. Just before time N the AC load device 120 was off receiving only a trickle charge, but at time N the trickle charge ceases to be drawn by the AC load device because the AC power source 130 is off. The power outage is detected by the current sensor 240 after a brief delay at time "O" but an observer would notice no change in the AC load device 120, although it has switched from a "soft-off" state to a "user-off" state. Subsequently at time P when a switch indication is received, since the AC load device 120 is in a "user-off" state the control unit 110 will not be able to powered on the AC load device 120. The processor may store the switch indication in a memory so that when power is subsequently restored the AC load device 120 will be allowed to turn back on. Time "Q" represents that subsequent point in time where AC power is restored. After a brief delay from time Q, the current sensor 240 will detect at time "R" the trickle charge drawn by the AC load device 120. Also, the relay 250 will immediately switch to allow full power to the AC load device 120, turning the AC load device 120 on.

Figure 4:
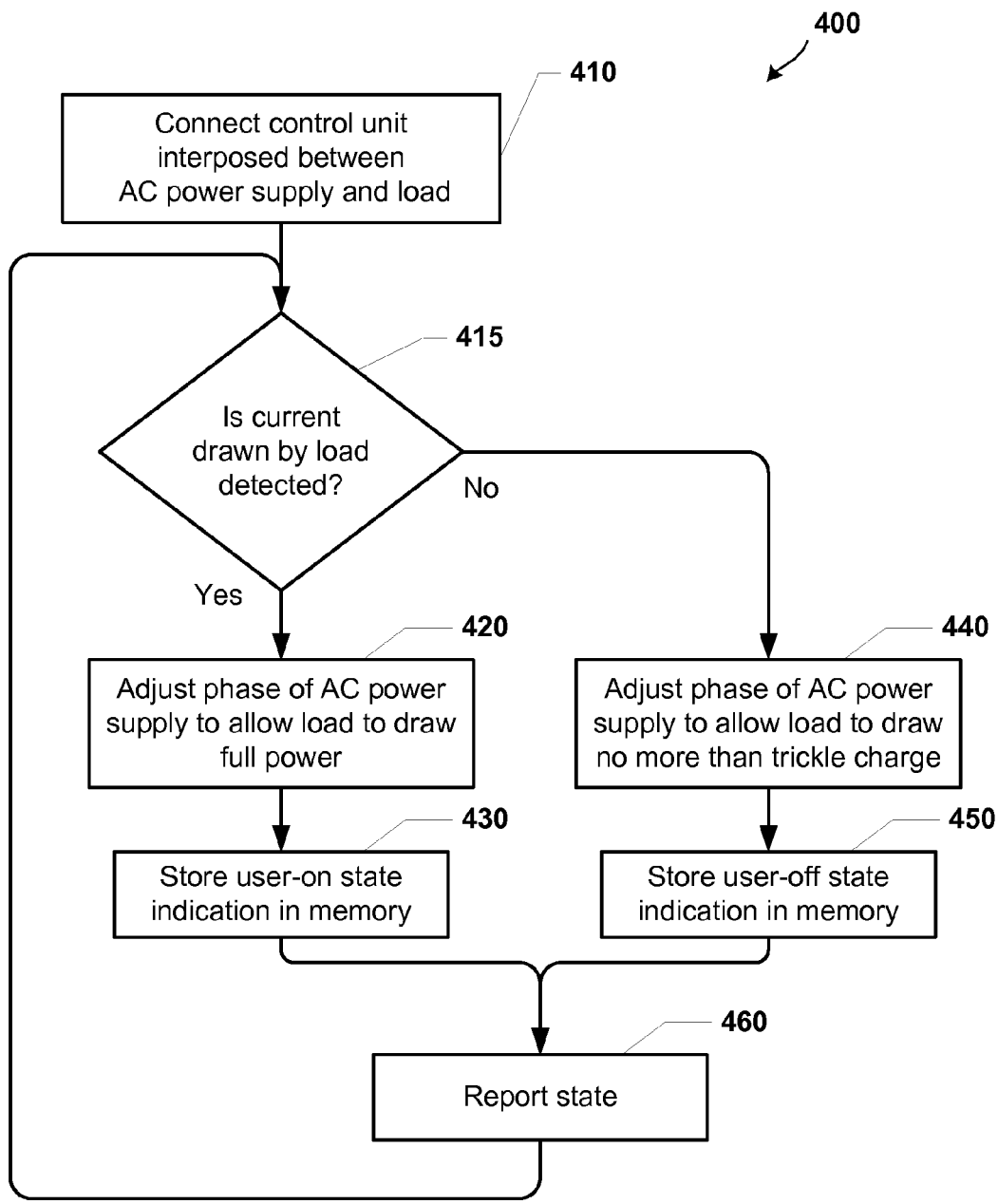
FIG. 4 is a process flow diagram illustrating an aspect method for AC load detection and control.

FIG. 4 illustrates an embodiment method 400 of controlling an AC load that may be implemented on an embodiment control unit 110. An initial setup or preliminary configuration may be established in block 410 that connects a control unit in-between an AC power source and a load device. The control unit processor may determine based on signals from a current sensor whether current from the AC power source is drawn by the load device in determination block 415. When the processor determines that the current sensor detects that current is being drawn by the load device (i.e., determination block 415="Yes"), the processor may send commands to the relay two adjust a phase of the AC power source to allow the load device to draw the full level of current available from the AC power source in block 420. With the phase adjusted to allow the load to draw full power, in block 430 the processor may store a "user-on" state indication in memory. When the processor determines that the current sensor detects no or very little current flowing to the load device is detected by the current sensor (i.e., determination block 415="No"), the processor may send commands to the relay to cause it to adjust a phase of the AC power source to allow the load device to draw no more than a trickle-charge of current in block 440. With the phase adjusted to restrict the load to draw only a trickle charge but, the processor may store a "user-off" state indication in memory in block 450. In block 460 the processor may report the load state (i.e., "user-on" or user-off) as stored in memory in either block 430 or 450 to a remote computer configured to receive such information. The processor may return to determination block 415 to continue monitoring whether the current sensor detects that current is being drawn by the load and adjusting the phase of the power source accordingly.

Figure 5:
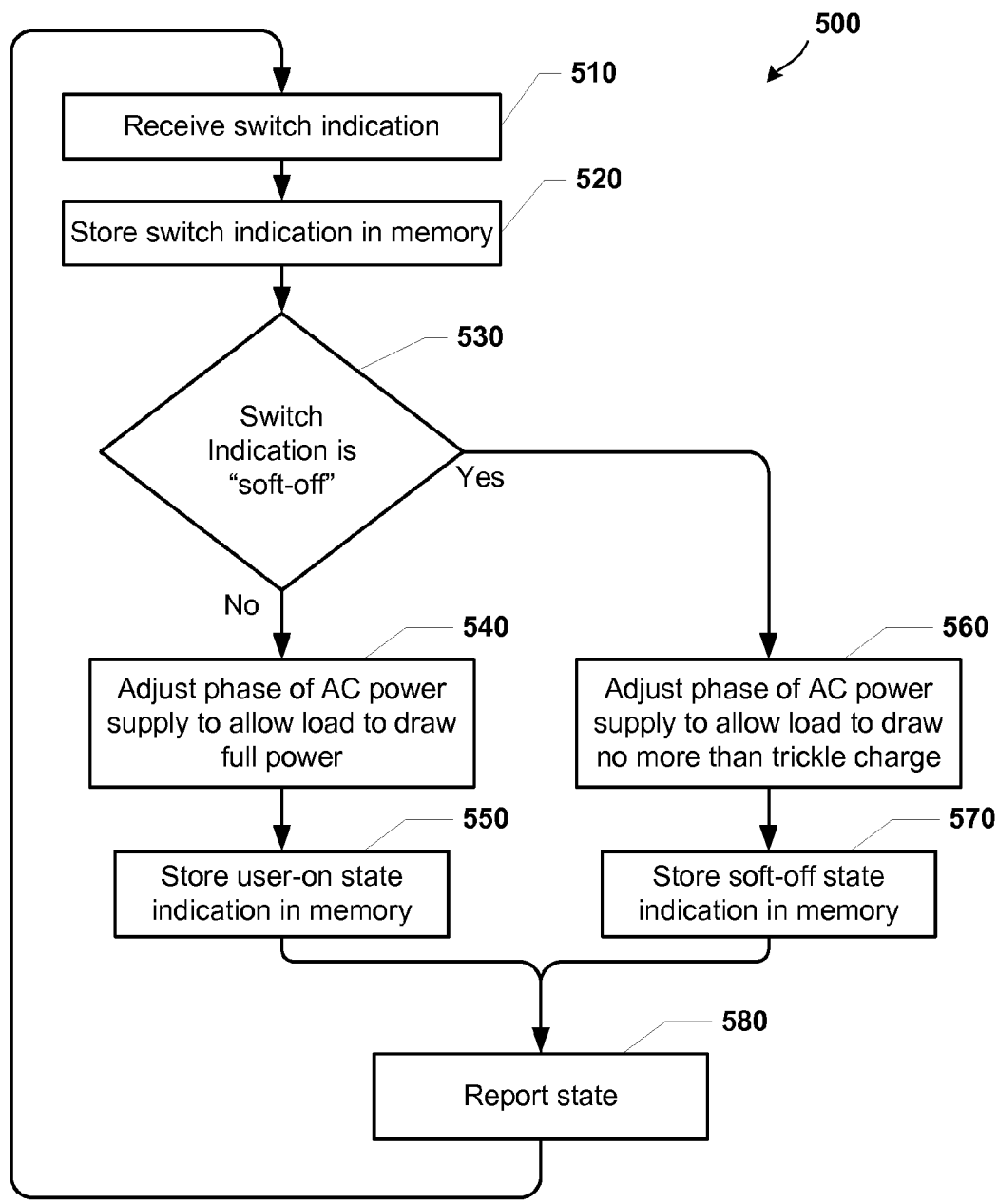
FIG. 5 is a process flow diagram illustrating another aspect method for AC load detection and control.

FIG. 5 an embodiment method 500 of remotely controlling an AC load that may be implemented on an embodiment control unit 110. The method 500 may be implemented on an embodiment control unit in conjunction with method 400 described above. In block 510 a switch indication may be received by a transceiver of the control unit and communicated to the processor of the control unit. The processor may determine, in determination block 530, whether the switch indication represents a command to place the AC load in a "soft-off" mode. When the processor determines that the switch indication does not represent a "soft-off" command (i.e., determination block 530="No"), the processor may command the relay to adjust a phase of the AC power source to allow the load device to draw the full level of current available from the AC power source in block 540. With the phase adjusted to allow the load to draw full power, in block 540 the processor may store a "user-on" state indication in memory. When the processor determines that the switch indication does represent a "soft-off" command (e.g., determination block 530="Yes"), the processor may send commands to the relay to adjust a phase of the AC power source to allow the load device to draw no more than a trickle-charge of current in block 560. With the phase adjusted to allow only a trickle charge, in block 570 the load device is considered to be in a "soft-off" state. In block 580 the processor may report the load state (i.e., "user-on" or soft-off) as stored in memory in either block 550 or 570 to a remote computer configured to receive such information. The processor may return to block 510 to receive further switch indications and subsequently adjusting the phase of the power source accordingly.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the," is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, processor, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory processor medium. The operations of a method or algorithm disclosed herein may be embodied in a processor-executable software module that may be stored on a non-transitory processor storage medium. Non-transitory processor storage media may be any available media that may be accessed by a processor. By way of example, and not limitation, such non-transitory processor media may comprise RAM, ROM, EEPROM, CD-ROM or other optical disk storage, magnetic disk storage or other magnetic storage devices, or any other medium that may be used to store desired processor executable code in the form of instructions or data structures and that may be accessed by a processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor media. Additionally, the operations of a method or algorithm may reside as one or any combination or set of codes and/or instructions on a non-transitory machine readable medium and/or processor medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A control unit for controlling current flowing to a load powered by an AC power source, the control unit comprising:
   a memory;
   a current sensor configured to detect whether current is drawn by the load from the AC power source;
   a relay coupled to the current sensor; and
   a phase detector configured to detect a zero-crossing point of the AC power source; and
   a processor coupled to the memory, the current sensor, the relay and the phase detector, wherein the processor is configured with processor-executable instructions to perform operations comprising:
      receiving from the current sensor a state indication indicating whether current is drawn by the load;
      storing the received state indication in the memory; and
      activating the relay to change a phase of current allowed to flow to the load using the zero-crossing point, wherein the phase of current allowed to flow to the load is adjusted to reduce a net current flow to the load to a trickle charge in response to the state indication indicating current is not being drawn by the load.

2. The control unit of claim 1, wherein the relay is one of a solid state relay and a triac.

3. The control unit of claim 1, wherein the processor is configured with processor-executable instructions to perform operations such that activating the relay to change the phase of current allowed to flow to the load using the zero-crossing point comprises adjusting the phase of current driving the load to allow full power to the load from the AC power source in response to the state indication indicating current is being drawn by the load.

4. The control unit of claim 1, wherein the phase of current allowed to flow to the load allows only the trickle charge to flow to the load as a default when the control unit powers-on.

5. The control unit of claim 1, wherein the processor is configured with processor-executable instructions perform operations such that storing the received state indication in the memory comprises storing a "user-on" state as the state indication in response to the current sensor detecting that current is being drawn by the load and storing a "user-off" state as the state indication in response to the current sensor not detecting that current is being drawn by the load.

6. The control unit of claim 1, further comprising a transceiver coupled to the processor and configured to communicate the stored state indication to a remote computing device.

7. The control unit of claim 6, wherein the processor is configured with processor-executable instructions perform operations such that activating the relay to change the phase of current allowed to flow to the load is in response to the transceiver receiving a switch indication from the remote computing device.

8. The control unit of claim 1, wherein the processor is configured with processor-executable instructions to perform operations further comprising receiving from the phase detector a trigger signal, wherein the relay is activated to change the phase of current allowed to flow to the load in response to receiving the trigger signal.

9. A method of controlling current flowing to a load powered by an AC power source, the method comprising:
   receiving from a current sensor a state indication indicating whether current is drawn by the load from the AC power source;
   storing the received state indication in a memory;
   receiving from a phase detector a trigger signaling a zero-crossing point of the AC power source; and
   activating a relay coupled to the current sensor to change a phase of current allowed to flow to the load using the zero-crossing point, wherein the phase of current allowed to flow to the load is adjusted to reduce a net current allowed to flow to the load to a trickle charge in response to the state indication indicating current is not being drawn by the load.

10. The method of claim 9, wherein activating the relay to change the phase of current allowed to flow to the load using the zero-crossing point comprises adjusting the phase of current driving the load to allow full power to the load from the AC power source in response to the state indication indicating current is being drawn by the load.

11. The method of claim 9, further comprising:
    setting as a default the phase of current allowed to flow to the load to allow only the trickle charge to flow to the load.

12. The method of claim 9, wherein storing the received state indication in the memory comprises storing a "user-on" state as the state indication in response to the current sensor detecting that current is being drawn by the load and storing a "user-off" state as the state indication in response to the current sensor not detecting that current is being drawn by the load.

13. The method of claim 9, further comprising transmitting the stored state indication to a remote computing device using a transceiver.

14. The method of claim 13, further comprising:
    receiving a switch indication from the remote computing device, wherein activating the relay to change the phase of current allowed to flow to the load is in response to receiving the switch indication.

15. The method of claim 9, further comprising receiving from the phase detector a trigger signal, wherein the relay is activated to change the phase of current allowed to flow to the load in response to receiving the trigger signal.

16. A control unit for controlling current flowing to a load powered by an AC power source, the control unit comprising:
    means for detecting whether current is drawn by the load from the AC power source;
    means for detecting a zero-crossing point of the AC power source;
    means for receiving from the means for detecting whether current is drawn by the load from the AC power source a state indication indicating whether current is drawn by the load;
    means for storing the received state indication; and
    means for changing a phase of current allowed to flow to the load using the zero-crossing point comprising means for adjusting the phase of current allowed to flow to the load by reducing a net current allowed to flow to the load to a trickle charge in response to the state indication indicating current is not being drawn by the load.

17. The control unit of claim 16, wherein means for changing the phase of current flowing to the load comprises means for conducting current in either one of two directions.

18. The control unit of claim 16, wherein means for changing the phase of current allowed to flow to the load using the zero-crossing point comprises means for adjusting the phase of current driving the load to allow full power to the load from the AC power source in response to the state indication indicating current is being drawn by the load.

19. The control unit of claim 16, wherein means for changing the phase of current allowed to flow to the load comprising means for allowing only the trickle charge to flow to the load as a default when the control unit powers-on.

20. The control unit of claim 16, wherein the means for storing the received state indication comprises:
    means for storing a "user-on" state as the state indication in response to the means for detecting whether current is drawn detecting that current is being drawn by the load; and
    means for storing a "user-off" state as the state indication in response to the means for detecting whether current is drawn detecting that current is not being drawn by the load.

21. The control unit of claim 16, further comprising means for transmitting the stored state indication to a remote computing device.

22. The control unit of claim 21, further comprising means for receiving a switch indication from the remote computing device, wherein the received switch indication activates the means for changing the phase of current allowed to flow to the load.

23. The control unit of claim 16, further comprising means for receiving from the means for detecting the zero-crossing point of the AC power source a trigger signal, wherein the means for changing the phase of current allowed to flow to the load comprises means for changing the phase of current allowed to flow to the load in response to receiving the trigger signal.

24. A non-transitory processor-readable storage medium having stored thereon processor-executable instructions configured to cause a processor, coupled to a memory, a current sensor, a relay and a phase detector, to perform operations for controlling current flowing to a load powered by an AC power source comprising:
    receiving from the current sensor a state indication indicating whether current is drawn by the load from the AC power source;
    storing the received state indication in the memory;
    receiving from the phase detector a trigger signaling a zero-crossing point of the AC power source; and
    activating the relay coupled to the current sensor to change a phase of current allowed to flow to the load using the zero-crossing point, wherein the phase of current allowed to flow to the load is adjusted to reduce a net current allowed to flow to the load to a trickle charge in response to the state indication indicating current is not being drawn by the load.

25. The non-transitory processor-readable storage medium of claim 24, wherein the stored processor-executable instructions are configured to cause the processor to perform operations such that activating the relay to change the phase of current allowed to flow to the load using the zero-crossing point comprises adjusting the phase of current driving the load to allow full power to the load from the AC power source in response to the state indication indicating current is being drawn by the load.

26. The non-transitory processor-readable storage medium of claim 24, wherein the stored processor-executable instructions are configured to cause the processor to perform operations further comprising:

setting as a default the phase of current allowed to flow to the load to allow only the trickle charge to flow to the load.

27. The non-transitory processor-readable storage medium of claim 24, wherein the stored processor-executable instructions are configured to cause the processor to perform operations such that storing the received state indication in the memory comprises storing a "user-on" state as the state indication in response to the current sensor detecting that current is being drawn by the load and storing a "user-off" state as the state indication in response to the current sensor not detecting that current is being drawn by the load.

28. The non-transitory processor-readable storage medium of claim 24, wherein the stored processor-executable instructions are configured to cause the processor to perform operations further comprising transmitting the stored state indication to a remote computing device using a transceiver.

29. The non-transitory processor-readable storage medium of claim 28, wherein the stored processor-executable instructions are configured to cause the processor to perform operations further comprising:

receiving a switch indication from the remote computing device, wherein activating the relay to change the phase of current allowed to flow to the load is in response to receiving the switch indication.

30. The non-transitory processor-readable storage medium of claim 24, wherein the stored processor-executable instructions are configured to cause the processor to perform operations further comprising receiving from the phase detector a trigger signal, wherein the relay is activated to change the phase of current allowed to flow to the load in response to receiving the trigger signal.

* * * * *